US012289820B2

(12) United States Patent
Pokidov et al.

(10) Patent No.: US 12,289,820 B2
(45) Date of Patent: *Apr. 29, 2025

(54) METHOD AND APPARATUS FOR IMPEDANCE MATCHING IN A POWER DELIVERY SYSTEM FOR REMOTE PLASMA GENERATION

(71) Applicant: MKS Instruments, Inc., Andover, MA (US)

(72) Inventors: Ilya Pokidov, Winchester, MA (US); Mohammad Kamarehi, Lexington, MA (US); Kenneth B. Trenholm, Salem, NH (US); Fedir Viktorovych Teplyuk, Lowell, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,281

(22) Filed: Feb. 26, 2024

(65) Prior Publication Data

US 2024/0196510 A1 Jun. 13, 2024

Related U.S. Application Data

(63) Continuation of application No. 17/406,378, filed on Aug. 19, 2021, now Pat. No. 11,956,885.

(51) Int. Cl.
*H05H 1/46* (2006.01)
*H05H 1/24* (2006.01)
(Continued)

(52) U.S. Cl.
CPC .............. *H05H 1/463* (2021.05); *H05H 1/24* (2013.01); *H05H 1/26* (2013.01); *H05H 1/28* (2013.01); *H05H 1/30* (2013.01)

(58) Field of Classification Search
None
See application file for complete search history.

(56) References Cited

U.S. PATENT DOCUMENTS 5,223,457 A * 6/1993 Mintz ............... H01J 37/32082 427/574
5,621,331 A 4/1997 Smith et al.
(Continued)

FOREIGN PATENT DOCUMENTS

KR 10-2020-0001970 A 1/2020
WO WO-2012/021325 A2 2/2012
WO WO-2021-045991 A1 3/2021

OTHER PUBLICATIONS

"Notification of Transmittal of the International Search Report and the Written Opinion of the International Searching Authority, or the Declaration," International Filing Date: Aug. 2, 2022, International Application No. PCT/US2022/039149, Applicant: MKS Instruments, Inc., Date of Mailing: Nov. 17, 20202, pp. 1-11.
(Continued)

*Primary Examiner* — Srinivas Sathiraju
(74) *Attorney, Agent, or Firm* — Cesari and McKenna, LLP

(57) ABSTRACT

A plasma-generation system is provided that includes a variable-frequency microwave generator configured to generate microwave power and a plasma applicator configured to use the microwave power from the microwave generator to (i) ignite a process gas therein for initiating a plasma in a plasma ignition process and (ii) maintain the plasma in a steady state process. The system also includes a coarse tuner connected between the microwave generator and the plasma applicator. At least one physical parameter of the coarse tuner is adapted to be set to achieve coarse impedance matching between the microwave generator and the plasma generated during both the plasma ignition process and the
(Continued)

steady state process. A load impedance of the plasma generated during the plasma ignition process and the steady state process is adapted to vary. The microwave generator is configured to tune an operating frequency at the set physical parameter of the coarse tuner.

20 Claims, 9 Drawing Sheets

(51) Int. Cl.

*H05H 1/26* (2006.01)
*H05H 1/28* (2006.01)
*H05H 1/30* (2006.01)

(56) References Cited

U.S. PATENT DOCUMENTS

| | | | | |
|---|---|---|---|---|
| 5,869,817 | A * | 2/1999 | Zietlow | H05B 6/70 219/696 |
| 5,965,034 | A * | 10/1999 | Vinogradov | H01J 37/321 315/111.21 |
| 6,855,906 | B2 * | 2/2005 | Brailove | H05H 1/46 219/121.36 |
| 8,647,585 | B2 * | 2/2014 | Hancock | A61N 5/022 422/186.04 |
| 8,900,521 | B2 * | 12/2014 | Hancock | A61L 2/0011 422/186 |
| 9,595,930 | B2 | 3/2017 | Garuti et al. | |
| 9,675,716 | B2 * | 6/2017 | Hancock | A61N 5/022 |
| 9,831,066 | B1 * | 11/2017 | Kamarehi | H01J 37/32467 |
| 10,790,118 | B2 * | 9/2020 | Kamarehi | H05B 6/6447 |
| 11,049,694 | B2 * | 6/2021 | AuBuchon | H01J 37/32266 |
| 11,222,770 | B2 * | 1/2022 | Kamarehi | H05B 6/702 |
| 11,404,248 | B2 * | 8/2022 | Kraus | H01J 37/32311 |
| 11,670,489 | B2 * | 6/2023 | AuBuchon | H01J 37/32256 315/111.21 |
| 11,956,885 | B2 * | 4/2024 | Pokidov | H05H 1/24 |
| 2010/0296977 | A1 * | 11/2010 | Hancock | A61L 2/24 422/186 |
| 2013/0146225 | A1 * | 6/2013 | Chen | H01J 37/32495 156/345.33 |
| 2014/0066838 | A1 * | 3/2014 | Hancock | A61L 2/24 604/23 |
| 2015/0279626 | A1 * | 10/2015 | Chen | H01J 37/3222 315/111.51 |
| 2017/0173846 | A1 * | 6/2017 | Chen | H05B 6/707 |
| 2017/0232122 | A1 * | 8/2017 | Hancock | A61L 2/14 604/23 |
| 2018/0130638 | A1 * | 5/2018 | Ahmad | H01J 37/32229 |
| 2018/0151332 | A1 | 5/2018 | Kaneko et al. | |
| 2018/0269037 | A1 * | 9/2018 | Kamarehi | H05B 6/6447 |
| 2018/0345569 | A1 * | 12/2018 | Chen | B29C 49/6418 |
| 2020/0022246 | A1 * | 1/2020 | Chen | H05H 1/46 |
| 2020/0171180 | A1 * | 6/2020 | Hancock | A61L 2/14 |
| 2020/0381217 | A1 * | 12/2020 | Kraus | H01J 37/3244 |
| 2021/0005430 | A1 * | 1/2021 | Kamarehi | H01J 37/32266 |
| 2021/0098236 | A1 * | 4/2021 | AuBuchon | H01J 37/32256 |
| 2021/0313153 | A1 * | 10/2021 | AuBuchon | H01J 37/32266 |
| 2022/0243333 | A1 * | 8/2022 | Kamarehi | C23C 16/45536 |
| 2023/0057795 | A1 * | 2/2023 | Pokidov | H05H 1/28 |
| 2024/0196510 | A1 * | 6/2024 | Pokidov | H05H 1/24 |

OTHER PUBLICATIONS

"SmartmatchTM Intelligent Microwave Matching Unit Model AX3060," Installation and Operations Manual, Part No. OM32000, Rev. E, Jul. 2001, 90 pgs.

"Three Stub Tuner Model AX3041," Installation and Operations Manual, Part No. OM30001, Rev. C, May 2013, 17 pgs.

* cited by examiner

METHOD AND APPARATUS FOR IMPEDANCE MATCHING IN A POWER DELIVERY SYSTEM FOR REMOTE PLASMA GENERATION

CROSS REFERENCE TO RELATED APPLICATION

This application is a continuation of U.S. patent application Ser. No. 17/406,378, filed on Aug. 19, 2021, the entire content of which is owned by the assignee of the instant application and incorporated herein by reference in its entirety.

FIELD OF THE INVENTION

The invention generally relates to the field of microwave remote plasma sources and microwave power delivery systems. More specifically, the invention relates to impedance matching mechanisms in power delivery systems for improved power coupling into plasma sources and reduced reflected power from the plasma sources.

BACKGROUND

FIG. 1 shows an exemplary prior art microwave power delivery system 100 configured for remote plasma generation in a microwave plasma applicator 102. As shown, the system 100 includes a variable-frequency solid-state microwave power generator 104 connected to the plasma applicator 102 for coupling microwave power to the plasma applicator 102 to generate a plasma within a plasma tube 116 of the applicator 102. An isolator 106 can be coupled to the connection between the power generator 104 and the plasma applicator 102, where the isolator 106 is configured to prevent reflected power from the plasma applicator 102 from feeding back to and potentially damaging the power generator 104. In addition, the isolator 106 can include a directional coupler (not shown) for measuring the amount of power reflected from the plasma load at the plasma applicator 102 to the power generator 104. In the prior art system 100, a combination of an automatic impedance matching network 108 and a power detector 110 implemented on a waveguide 114 is also connected between the power generator 104 and the plasma applicator 102 to (i) enable automatic impedance adjustment and matching between the power generator 104 and the plasma load generated at the plasma applicator 102 and (ii) minimize any microwave reflection upstream of the impedance matching network 108 as measured by the power detector 110. The load comprises the plasma generated at the plasma applicator 102, which can vary by several orders of magnitude to that of the power generator 104. The automatic impedance matching network 108 can be a SmartMatch™ network produced by MKS Instruments, Inc. located at Andover, Massachusetts.

In addition, the prior art system 100 can include multiple transmission line elements for interconnecting the various components. Typically, for low power systems, e.g., about 1 kilowatt (KW) and below, one or more coaxial cables are used instead of waveguides for interconnecting these components, such as the coaxial cable segments 112*a*, 112*b* shown in FIG. 1. Specifically, the coaxial cable segment 112*a* serves as an upstream connection between the power generator 104 and the impedance matching network 108, and the coaxial cable segment 112*b* servers as a downstream connection between the impedance matching network 108 and the plasma applicator 102. Typically, each coaxial cable segment 112 is a ⅞ coaxial cable, which can have a power rating of about 1 kW at about 2.45 GHz.

In the prior art system 100, if microwave power from the power generator 104 is not coupled efficiently to the plasma generated inside of the plasma applicator 102, a portion of that power is likely to be reflected back toward the power generator 104. FIG. 2 shows a set of simulation results of microwave power coupled to the plasma as a function of frequency for the prior art microwave power delivery system 100 of FIG. 1 at about 1 kilowatt of input power. Because plasma impedance or conductivity of the load in the plasma applicator 102 can vary widely depending on the type of process gas and operating conditions, plasma conductivity is varied by 3 orders of magnitude in the simulation of FIG. 2. As shown, at the center frequency of about 2.45 GHz, power absorbed in the plasma varies from about 361 W to about 726 W depending on plasma conductivity, while the power delivered by the generator 104 is about 1 kW. This means that for about 1 kW power input the reflected power varies from about 274 W to about 639 W.

Therefore, in the instances where the coupling of microwave energy into the plasma is not optimal, some power may be reflected from the applicator 102 back toward the generator 104 as explained above. The automatic impedance matching network 108 is configured to only minimize power reflection upstream (i.e., between the power generator 104 and the impedance matching network 108). The automatic impedance matching network 108 thus considers as a load everything on the downstream side of the network 108, including the applicator 102 with the plasma therein, the downstream coaxial cable 112*b*, and the waveguide 114 to coaxial cable transition. Therefore, because the automatic impedance matching network 108 prevents reflected power from passing upstream, a significant portion of the power reflected from the plasma applicator 102 is forced to be dissipated downstream, such as being absorbed in the downstream coaxial cable 112*b* between the impedance matching network 108 and the plasma applicator 102. The reflected microwave power can be absorbed in the downstream coaxial cable 112*b* via conduction losses and dielectric losses. Conduction losses are resistive losses in the inner and outer conductors of the coaxial cable 112*b*. Dielectric losses are losses in the dielectric material used to construct the coaxial cable 112*b* for maintaining proper spacing between inner and outer conductors. In general, excessive reflected power in a coaxial cable, such as in the downstream coaxial cable 112*b*, can cause a buildup of high electric field, which can in turn cause excessive heat dissipation and subsequent cable overheating. As explained above, in the case of poor microwave coupling into plasma, reflected power can be rather high, on the order of several hundred watts. The downstream ⅞ coaxial cable 112*b* is not typically configured to dissipate such high reflected power and can easily overheat.

Another disadvantage of the prior art system 100 is that even though the solid-state microwave generator 104 can operate within a frequency band, such as between about 2.4 and about 2.5 GHz, due to the frequency limitation of the impedance matching network 108, the operating frequency for the low-powered remote plasma generator system 100 (e.g., a 1 kW system) is effectively fixed, e.g., at 2.45 GHz.

SUMMARY

Therefore, there is a need for an impedance matching mechanism in a remote microwave power delivery system capable of improving power coupling and reducing reflected power between a variable frequency solid-state microwave generator and a plasma applicator. Specifically, it is desirable to design an impedance matching mechanism to prevent overheating of the downstream coaxial cable in the power delivery system, such as the coaxial cable 112*b* of the power delivery system 100 described above with reference to FIG. 1. In some embodiments, such improved power coupling and reduced reflected power is achieved in the present invention via a combination of (i) a coarser tuner (e.g., a quarter wavelength fixed stub tuner) and (ii) a variable-frequency solid-state microwave generator configured to vary its operating frequency within a frequency range. This combination allows impedance matching to be achieve over a wide range of load impedances.

In one aspect, a plasma-generating system is provided. The system includes a variable-frequency microwave generator configured to generate microwave power and a plasma applicator configured to use the microwave power from the microwave generator to (i) ignite a process gas therein for initiating a plasma in a plasma ignition process and (ii) maintain the plasma in a steady state process. The system also includes a coarse tuner connected between the microwave generator and the plasma applicator. At least one physical parameter of the coarse tuner is adapted to be set to achieve coarse impedance matching between the microwave generator and the plasma generated during both the plasma ignition process and the steady state process. A load impedance of the plasma generated during the plasma ignition process and the steady state process is adapted to vary over an impedance range. The microwave generator is configured to tune an operating frequency at the set physical parameter of the coarse tuner to achieve at least one of (i) ignition of the process gas during the plasma ignition process or (ii) maximization of the microwave power delivered to the plasma in the steady state process.

In another aspect, a method is provided for generating plasma in a system that includes a variable-frequency microwave generator connected to a plasma applicator. The method includes disposing a coarse tuner between the microwave generator and the plasma applicator such that the coarse tuner is positioned adjacent to the plasma applicator and configuring one or more physical parameters of the coarse tuner to achieve coarse impedance matching between the microwave generator and plasma generated by the plasma applicator during both plasma ignition and steady state plasma generation. A load impedance of the plasma generated during plasma ignition and steady state plasma generation is adapted to vary over an impedance range. The method further includes flowing a process gas into a plasma tube of the plasma applicator, setting a frequency of the microwave generator to an initial frequency value to initiate microwave power, coupling the microwave power to the plasma applicator to ionize the process gas therein, and iteratively fine tuning the frequency of the microwave generator relative to the initial frequency without altering the one or more physical parameters of the coarse tuner. Each iteration comprises determining if the process gas in the plasma tube is ignited for initiating a plasma at the microwave power corresponding to the tuned frequency, and discontinuing fine tuning the frequency of the microwave generator if ignition is detected.

Any of the above aspects can include one or more of the following features. In some embodiments, the coarse tuner is immediately adjacent to the plasma applicator without a coaxial cable connection therebetween. In some embodiments, the coarse tuner includes an integrated coupling element for coupling microwave power from the microwave generator to a microwave cavity of the plasma applicator.

In some embodiments, the coarse tuner is a fixed stub tuner that includes at least a stub and a coupling antenna. The fixed stub tuner is disposed proximate to a dielectric plasma tube. The at least one physical parameter of the fixed stub tuner comprises one of (i) a distance between the stub and a longitudinal axis of the dielectric plasma tube and (ii) a length of the stub. In some embodiments, the stub length is about 1.21 inches and the distance is about 2.96 inches. In some embodiments, at least one of the stub length or the distance is adjustable to achieve the coarse impedance matching. In some embodiments, the fixed stub tuner is a quarter wavelength fixed stub tuner. In some embodiments, the fixed stub is electrically shorted to prevent microwave radiation to the environment.

In some embodiments, the coarse impedance matching comprises modifying the load impedance of the plasma over the impedance range such that a maximum of power absorbed by the plasma is within an operating bandwidth of the variable-frequency microwave generator. In some embodiments, an automatic impedance matching network is absent between the microwave generator and the plasma applicator. In some embodiments, an isolator is located between the microwave generator and the coarse tuner to minimize reflected power from the plasma applicator to the microwave generator.

In some embodiments, a process pressure of the plasma applicator is set after the process gas flow is stabilized.

In some embodiments, the iterative fine tuning of the frequency of the microwave generator comprises iteratively increasing the frequency from the initial frequency by a predetermined step until an upper bound is reached. In some embodiments, the iterative fine tuning of the frequency of the microwave generator comprises iteratively decreasing the frequency from the initial frequency by a predetermined step until a lower bound is reached.

In some embodiments, the microwave power delivered to the plasma is maximized after ignition is detected. Maximizing the microwave power includes setting the frequency of the microwave generator to a second initial frequency value to generate microwave power, coupling the microwave power to the plasma applicator to maintain the plasma therein, and iteratively tuning the frequency of the microwave generator relative to the second initial frequency without altering the one or more physical parameters of the coarse tuner until a threshold frequency is reached. Each iteration includes calculating a value of the microwave power delivered to the plasma and recording the calculated microwave power value and the corresponding tuned frequency. Maximizing the microwave power also includes determining a maximum of the calculated microwave power values recorded, and setting the microwave generator to the tuned frequency corresponding to the maximum calculated microwave power value for maintaining the plasma in the plasma applicator in a steady state. In some embodiments, calculating a value of the microwave power delivered to the plasma comprises determining a forward power value and a reflected power value, and determining a difference between the forward power value and the reflected power value to calculate the value of the microwave power delivered to the plasma. In some embodiments, the iterative fine tuning of the frequency of the microwave generator comprises iteratively increasing the frequency from the second initial frequency by a predetermined step until the threshold frequency is reached. In some embodiments, the iterative fine tuning of the frequency of the microwave generator comprises iteratively decreasing the frequency from the second initial frequency by a predetermined step until the threshold frequency is reached. In some embodiments, initiating the plasma in the plasma tube and maximizing the microwave power delivered to the plasma after ignition are achieved without adjusting impedance matching between the microwave generator and a load of the plasma.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION

Figure 3:
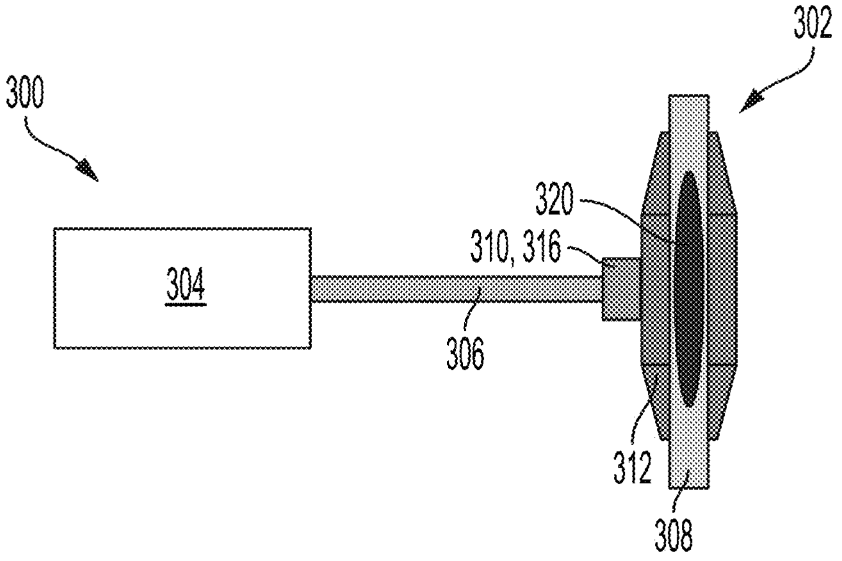
FIG. 3 shows an exemplary power delivery system configured for remote plasma generation, according to some embodiments of the present invention.

FIG. 3 shows an exemplary power delivery system 300 configured for remote plasma generation, according to some embodiments of the present invention. As shown, the system 300 includes a plasma applicator 302 where plasma 320 is generated by coupling remote microwave power from a variable-frequency solid-state microwave generator 304. At least one transmission line element, such as a coaxial cable 306 (e.g., a ⅞ coaxial cable), is used to form an electrical connection between the plasma applicator 302 and the microwave generator 304. In some embodiments, the power delivery system 300 is a low power system, such as operating at about 1 kilowatt (kW) and below.

In some embodiments, the plasma applicator 302 includes a plasma discharge tube 308 in which one or more process gases are excited by the microwave energy coupled thereto to generate the plasma 320 in the discharge tube 308. The plasma applicator 306 also includes a coupling element 310 attached to the outer housing of the plasma applicator 302 for coupling the microwave energy from the microwave generator 304 into a microwave cavity 312 of the plasma applicator 302. In some embodiments, the plasma applicator 302 includes a plasma detector (not shown) for detecting when plasma 320 is ignited. In some embodiments, the plasma applicator 302 is substantially similar to the microwave plasma applicator described in U.S. Pat. No. 9,831,066, which is owned by the assignee of the instant application and is hereby incorporated by reference in its entirety. In operation, the plasma applicator 302 is configured to couple the microwave power from the microwave generator 304 to (i) ignite the one or more process gases in the plasma discharge tube 308 for initiating the plasma 320 in a plasma ignition process and (ii) maintain the plasma 320 in a steady state process after the initial ignition process.

In some embodiments, the variable frequency solid-state microwave generator 304 is configured to operate within one or several Industrial, Scientific and Medical (ISM) frequency bands, including but not limited to about 2.4 GHz to about 2.5 GHZ, about 902 MHz to about 928 MHz or about 5.725 GHZ to about 5.875 GHz. The microwave generator 304 can include a directional coupler (not shown) for measuring forward and reflected power at the output of the microwave generator 304. The microwave generator 304 can also include one or more built-in isolators (not shown), such as installed at the output of each of the power amplifier stages of the generator 304 to protect the power amplifiers from high reflected power. In some embodiments, the microwave generator 304 is substantially similar to the microwave generator described in U.S. Pat. No. 9,595,930, which is owned by the assignee of the instant application and is hereby incorporated by reference in its entirety.

In some embodiments, a coarse tuner 316 is disposed between the microwave generator 304 and the plasma applicator 302 in the power delivery system 300. The coarse tuner 316 can be placed upstream and adjacent to the plasma applicator 302 along the coaxial cable 306, such as integrated with the coupling element 310 connected immediately upstream of the microwave applicator 302 and attached to the outer housing of the microwave applicator 302. In alterative embodiments, the coarse tuner 316 is a standalone component upstream and adjacent (e.g., immediately adjacent/attached) to the plasma applicator 302. The coarse tuner 316 can be connected to the plasma applicator 302 without a coaxial cable (or any other connection element) therebetween. The type and location of the coarser tuner 316 can be chosen to prevent overheating of one or more connection elements in the system 300 by reducing power reflection from the microwave cavity 312 of the plasma applicator 302. In some embodiments, the coarse tuner 316 is configured to replace the automatic impedance matching network 108 of FIG. 1 such that any automatic impedance matching network that permits adjustment for achieving impedance matching during the plasma ignition process and/or steady state process is absent from the system 300 of FIG. 3.

In some embodiments, the coarse tuner 316 of the system 300 is a quarter wavelength fixed stub coarse tuner for achieving impedance matching in microwave power transmission and communication systems. Advantages of using a fixed stub tuner includes improved microwave power coupling into the plasma. However, unlike the load impedance in a typical power delivery system in which a fixed stub tuner is used (e.g., where the load impedance is fixed), the load impedance of the plasma load in the remote microwave plasma system 300 of FIG. 3 is variable by several orders of magnitude depending on the type of gas, pressure and delivered power. For example, the load of the plasma 320 can vary widely depending on whether the plasma applicator 302 is performing a plasma ignition process or a steady state plasma maintenance process. To ensure impedance matching with a varied load, the system 300 can further utilize the inherent ability of the solid-state microwave generator 304 to adjust its operating frequency within a frequency range (e.g., between about 2.4 GHz and about 2.5 GHZ) for fine impedance tuning after coarse impedance matching is accomplished via the use of the fixed stub tuner 316. This method of fixed impedance matching followed by fine impedance tuning can be used by the system 300 during both the initial plasma ignition process and the steady state plasma maintenance process.

In some embodiments, the quarter wavelength fixed stub coarse tuner 316 is positioned immediately upstream of the microwave cavity 312 so as to minimize any reflected power and standing wave in the transmission line elements upstream of the plasma applicator 302. For example, as explained above, the fixed stub tuner 316 can be integrated with the coupling element 310 attached to the outer housing of the plasma application 302, as shown in FIG. 3.

Figure 4:
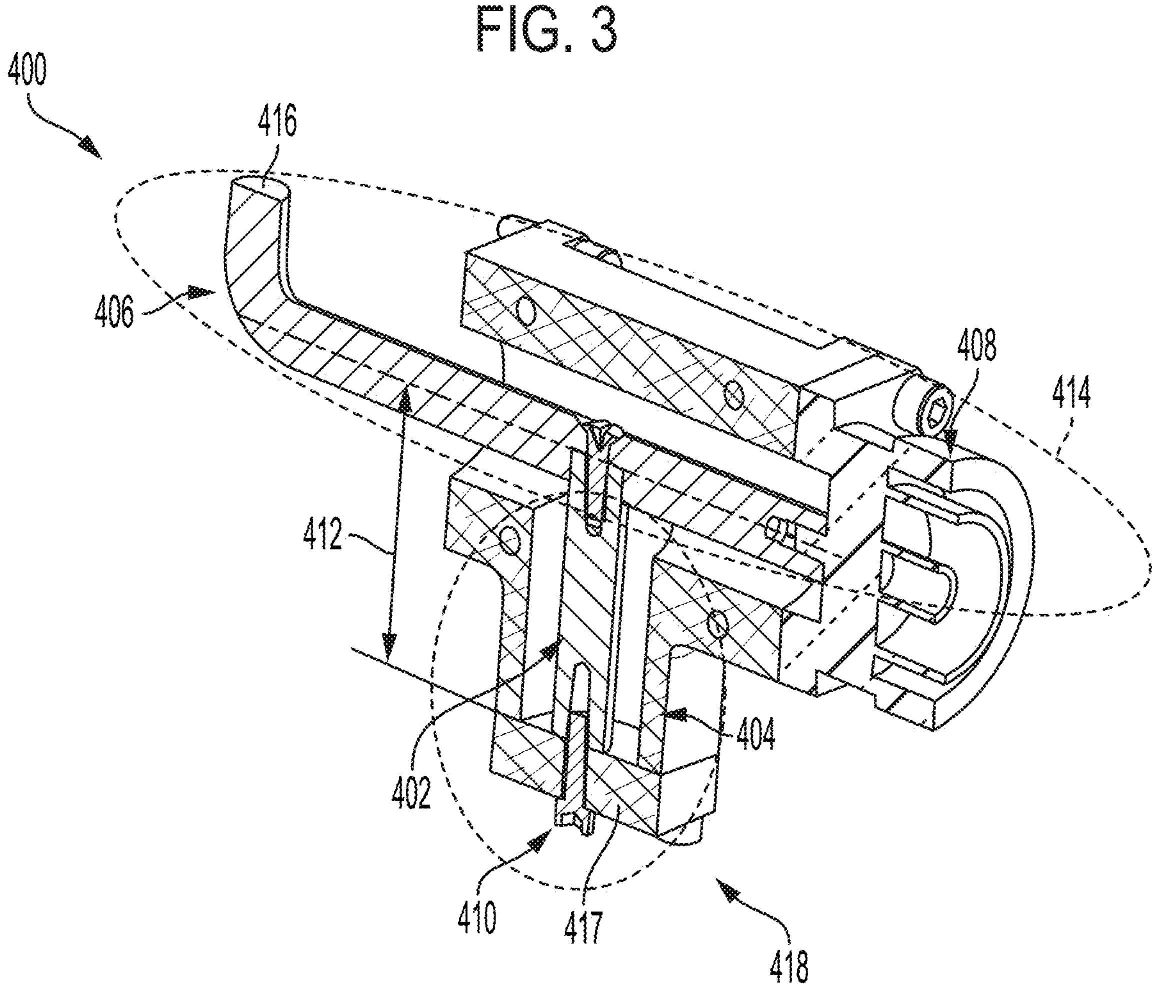
FIG. 4 shows an exemplary configuration of the coarse tuner of the power delivery system of FIG. 3, according to some embodiments of the present invention.

FIG. 4 shows an exemplary configuration 400 of the coarse tuner 316 of the power delivery system 300 of FIG. 3, according to some embodiments of the present invention. The coarse tuner 400 shown is a quarter wavelength fixed stub tuner with integrated power coupling. In some embodiments, the quarter wavelength fixed stub tuner 400 of FIG. 4 is compatible with a low power delivery system, such as a 1 kW remote microwave delivery system. As shown in FIG. 4, the fixed stub tuner 400 generally includes a center/inner conductor 402 and an outer conductor 404. The center conductor 402 is made from an electrically conductive material, such as copper. The center conductor 402 can be about 0.276 inches in diameter. The outer conductor 404 can be machined into an electrically conductive housing (e.g., an aluminum housing) that is configured to house the center conductor 402. The outer conductor 404 can have an inner diameter of about 0.632 inches. In some embodiments, these diameter values are selected so that the impedance of the stub coaxial elements is maintained at a predefined value (e.g., about 50 ohms) that matches the characteristic impedance of the transmission line (e.g., coaxial cable) 306 connected to the fixed stub tuner 400. In general, the inner and outer conductor diameters of the fixed stub tuner 400 can be adjusted accordingly to match the characteristic impedance of the transmission line 306.

As shown in FIG. 4, the fixed stub tuner 400 can be T-shaped, with a first end 406 comprising a coupling antenna 416 formed by the center conductor 402, a second end 408 configured for connection with the transmission line 306, and a third end 410 comprising a short segment 417 in connection with the end of the center conductor 402. In some embodiments, the second end 408 includes a 7/16 EIA connector configured to connect with a 7/8 coaxial cable transmission line 306. In general, the fixed stub tuner 400 can be designed to be compatible with the approximate dimensions of a 7/8 coaxial transmission line 306 with air as the dielectric material. In some embodiments, the segment 414 of the fixed stub tuner 400 between the first and second ends 406, 408 can form a portion of the transmission line 306 when the fixed stub tuner 400 is connected to the power delivery system 300 of FIG. 3. In addition, the segment of the fixed stub tuner 400 from the third end 410 to the transmission line segment 414 can be hereinafter referred to as the stub segment 418 of the fixed stub tuner 400.

In some embodiment, the third end 410 of the fixed stub tuner 400 is electrically shorted to prevent microwave leakage to the environment. Alternatively, the third end 410 of the fixed stub tuner 400 is electrically open. In some embodiments, the center conductor 402 is mechanically supported by the stub segment 418 of the fixed stub tuner 400, having the same inner and outer conductor diameters, and the center conductor 402 is attached to the stub segment 418 via the short segment 417 by, for example, a flat head screw. More specifically, the short segment 417 can be attached with screws to the outer conductor housing 404 and the center conductor 402. In some embodiments, the length 412 of the stub segment 418 is fixed prior to operating the power delivery system 300, such as to about a quarter wavelength at the operating frequency (e.g., 2.45 GHZ).

Figure 5:
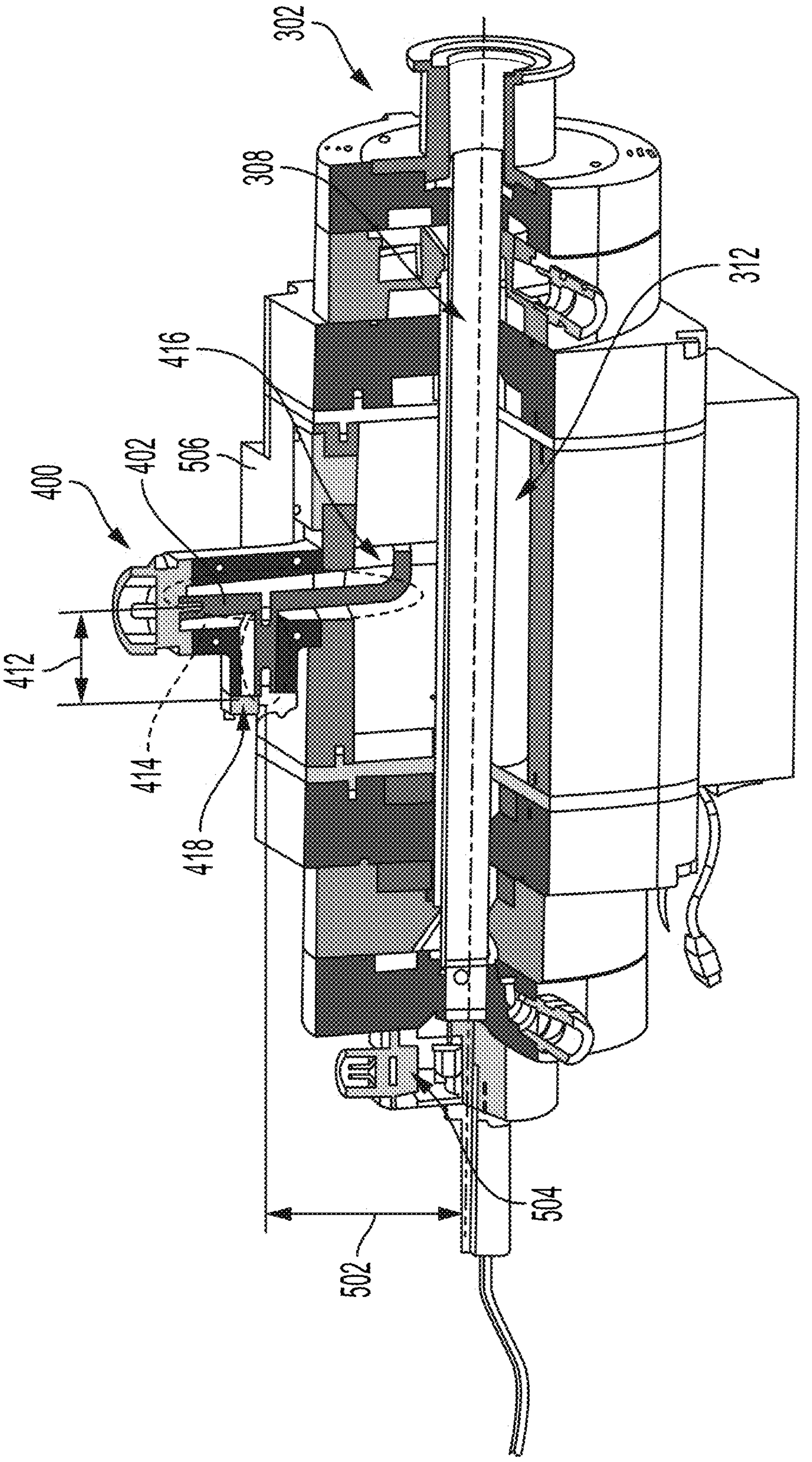
FIG. 5 shows an exemplary connection of the coarse tuner of FIG. 4 within the power delivery system of FIG. 3, according to some embodiments of the present invention.

FIG. 5 shows an exemplary connection of the coarse tuner 400 of FIG. 4 within the power delivery system 300 of FIG. 3, according to some embodiments of the present invention. As shown, the fixed stub tuner 400 of FIG. 4 is located immediately adjacent to the plasma applicator 302. For example, the fixed stub tuner 316 can be attached to an outer housing 506 of the plasma applicator 302 using screws, as shown on FIG. 4. In some embodiments, the inner conductor 402 of the fixed stub tuner 400 serves as a continuation of the coupling element 310. In some embodiments, the coupling antenna 416 at the first end 406 of the fixed stub tuner 400 is inserted into the microwave cavity 312 of the plasma applicator 302 and positioned proximate to the plasma discharge tube 308 inside of which the plasma 320 is generated. The antenna 416 couples power into the plasma 320 via one or more of inductive or capacitive coupling. As explained above, after the fixed stub tuner 400 is assembled into the power delivery system 300, the segment 414 of the fixed stub tuner 400 between the first and second ends 406, 408 are configured to become a portion of the coaxial cable transmission line 306.

In some embodiments, the power delivery system 300 further includes a plasma detector 504, shown in FIG. 5, coupled to the plasma applicator 302 to detect the occurrence of plasma ignition. The plasma detector 504 can be a photo diode or a photo transistor that is configured to detect light from the plasma 320 in the plasma discharge tube 308 transmitted through an optically transparent window. The plasma detector 504 can output an electrical signal (voltage or current) indicating the presence of plasma. This signal can be transmitted to the microwave generator 302 or a system controller (not shown) indicating successful plasma ignition.

In some embodiments, one or more parameters of the fixed stub tuner 400 are adjusted and set prior to operating the power delivery system 300 in order to achieve coarse impedance matching between the microwave generator 304 and the plasma load in the plasma applicator 302. This coarse matching is able to accomplish a reasonably good impedance match for a range of load impedances generated by the plasma 320 during both the plasma ignition process and the steady state plasma maintenance process. For example, for the course turner configuration 400 of FIG. 4, at least one of (i) the length 412 of the stub segment 418 of the fixed stub tuner 400 or (ii) the distance 502 between the stub segment 418 of the fixed stub tuner 400 and the longitudinal axis of the plasma discharge tube 308 can be adjusted prior to operating the power delivery system 300 to achieve the desired coarse impedance matching over a range of plasma load impedances.

Figure 6:
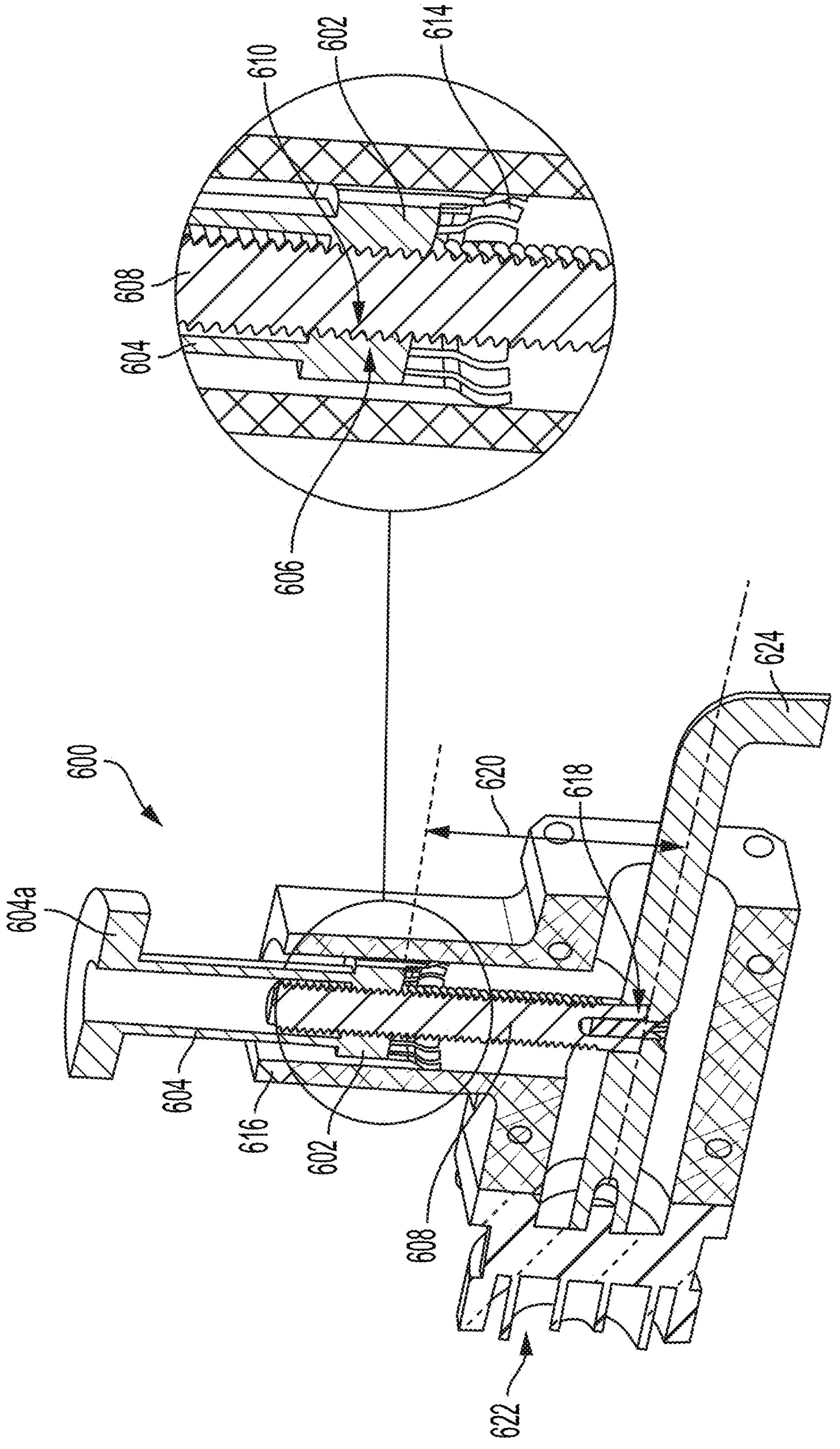
FIG. 6 shows another exemplary configuration of the coarse tuner of the power delivery system of FIG. 3, according to some embodiments of the present invention.

FIG. 6 shows another exemplary configuration 600 of the coarse tuner 316 of the power delivery system 300 of FIG. 3, according to some embodiments of the present invention. In general, the coarse tuner 600 is substantially similar to the fixed coarse tuner 400 of FIG. 4, except the coarse tuner 600 has a movable short segment 602 that can translate along the vertical direction, thus making it easier to vary the effective stub length 620 during experimentation for determining a reasonably good impedance match for a range of load impedances generated by the plasma 320. After this optimized stub length 620 is determined, it can be set without further adjustment during both the plasma ignition process and the steady state plasma maintenance process. In contrast, in the fixed coarse tuner configuration 400 of FIG. 4, the position of the short segment 417 is attached with screws to the outer conductor housing 404 and the center conductor 402 to immobilize its movement. Therefore, the stub length 412 of the coarse tuner 400 is fixed upon construction of the coarse tuner 400.

For the coarse tuner 600 of FIG. 6, the short segment 602 is attached to (such as integrally formed with) a retractable plunger 604, while the short segment 602 is sandwiched between a center conductor 608 and an outer conductor housing 616 of the tuner 600. The short segment 602 comprises two concentric cylindrical surfaces. The inner cylindrical surface of the short segment 602 has an internal or female thread 606 that is, for example, machined into the inner cylindrical surface. The female thread 606 is configured to mate with an external or male thread 610 of the center conductor 608. The resulting threaded connection allows maintenance of good electrical contact between the short segment 602 and the center conductor 608 and prevent microwave radiation to the environment. The outer cylindrical surface of the short segment 602 can have a thin ring with one or more spring fingers 614. The ring can be attached to the short segment 602 via soldering, for example. The outside diameter of the spring fingers 614 can be slightly larger than the inner diameter of the outer conductor housing 616, such that when the plunger assembly 604 is inserted into the outer conductor housing 616 the fingers 614 deform slightly to ensure good electrical contact between the short segment 602 and the outer conductor housing 616 and prevent microwave radiation to the environment. These types of connections allow the short segment 602 to move both circumferentially and axially with respect to both the center conductor 608 and the outer conductor 616 and maintain electrical contact at the same time. In operation, when the turning knob 604*a* of the plunger assembly 604 is turned in one direction (e.g., clockwise), the short segment 602 can move down toward the junction 618 of the tuner 600, provided that the thread is a right-handed thread. If the knob 604*a* is turned in the opposite direction (e.g., counter-clockwise), the short segment 602 can move up, away from the junction 618. Thus, the effective stub length 620 can be adjusted by turning the plunger knob 604*a* to translate the short segment 602.

Such an adjustable stub is beneficial during laboratory experiments, as it allows the adjustment of the stub length 620 to optimize microwave power coupling and minimize reflected power in a real laboratory setup. In some embodiments, the maximum effective stub length 620 (e.g., the maximum length the stub can be retracted from the junction 618) can be set to approximately between one quarter wavelength and full wavelength at the center frequency of the operating frequency band (e.g., between about 1.2 inches and about 4.82 inches at about 2.45 GHZ). Once the position corresponding to the optimal power coupling is found experimentally, the stub position can be locked to be used for other experiments and/or actual plasma generation within the power delivery system 300. Other configurations of adjustable short segment for a coarse tuner implemented on coaxial lines are possible and are within the scope of the present invention.

In some embodiments, the coarse tuner 600 is similarly connected to the power delivery system as the coarse tuner 400 as explained above with reference to FIG. 5. For example, one end of the coarse tuner 600 can include a 7⁄16 EIA connector 622 configured to connect with a ⅞ coaxial cable transmission line 306. Another end of the coarse tuner 600 can include a coupling antenna 624 formed by the center conductor 608, where the coupling antenna 624 is inserted into the microwave cavity 312 of the plasma applicator 302. In some embodiments, one or more parameters of the stub tuner 600 are adjusted and set prior to operating the power delivery system 300 in order to achieve coarse impedance matching between the microwave generator 304 and the plasma load in the plasma applicator 302. For example, at least one of (i) the stub length 620 or (ii) the distance 502 (shown in FIG. 5) between the plunger 604 of the stub tuner 600 and the longitudinal axis of the plasma discharge tube 308 can be adjusted prior to operating the power delivery system 300 to achieve the desired coarse impedance matching over a range of plasma load impedances.

Referring back to FIG. 3, in some embodiments, a single coarse tuner 316 is designed to provide impedance matching over a wide range of process recipes and their corresponding plasma impedances. This can be done by a combination of microwave modeling and experimentation that uses experimental results for refining the modeling results. For example, the adjustable parameters of the fixed stub tuner 400 of FIG. 4 (e.g., stub length 412 and/or stub-to-applicator distance 502) or that of the stub tuner 600 of FIG. 6 (e.g., stub length 620 and/or stub-to-applicator distance 502) can be determined experimentally by modifying the load impedance of the plasma 320 over a desired impedance range such that a maximum of power absorbed by the plasma 320 is within an operating bandwidth of the variable-frequency microwave generator 304. Thus, after the modeling and/or experimentation, the selected parameter values for the stub tuner 316 ensure that the maximum of power absorbed by the plasma 320 over a desired impedance range of the plasma 320 is within the operating bandwidth of the microwave generator 304. In one exemplary implementation of the fixed stub tuner 400 of FIG. 4, the stub-to-applicator distance 502 can be set to about 2.96 inches and the stub length 412 can be set to about 1.21 inches to ensure that the maximum of power absorbed by the plasma 320 is in a range of conductivity between about 0.1 S/m and about 100 S/m for an operating frequency range of between about 2.4 GHZ and about 2.5 GHZ. The physical parameters of the fixed stub tuner 316 can be determined experimentally using the simulation results explained below with respect to FIG. 7.

In some embodiments, several different coarse tuners (e.g., different fixed stub tuners 400, 600 with different dimensions for the stub-to-applicator distance 502 and/or stub length 412 or 620) can be designed for the power delivery system 300, where each coarse tuner's performance (e.g., power coupling and reduced reflected power capabilities) is optimized for a narrower range of plasma impedances, so as to cover a useful subset of process recipes in one semiconductor application, for example. In addition, different plasma applicators can be used in conjunction with different coarse tuners to cover different applications.

In some embodiments, because plasma impedance can vary significantly, especially before and after plasma ignition, the operating frequency of the solid-state microwave generator 304 can be adjusted within a predefined frequency range to fine tune impedance matching at the set physical parameter(s) of the coarse tuner 316. The fine tuning of the microwave generator 304 after the coarse impedance matching by the coarse tuner 316 can achieve at least one of (i) ignition of the process gas during the plasma ignition process or (ii) maximization of the microwave power delivered to the plasma in the steady state process, which is described in detail below in relation to FIGS. 8 and 9. In some embodiments, the frequency range within which the frequency of the microwave generator 304 can be adjusted is between about 2.4 GHz and about 2.5 GHZ.

Figure 7:
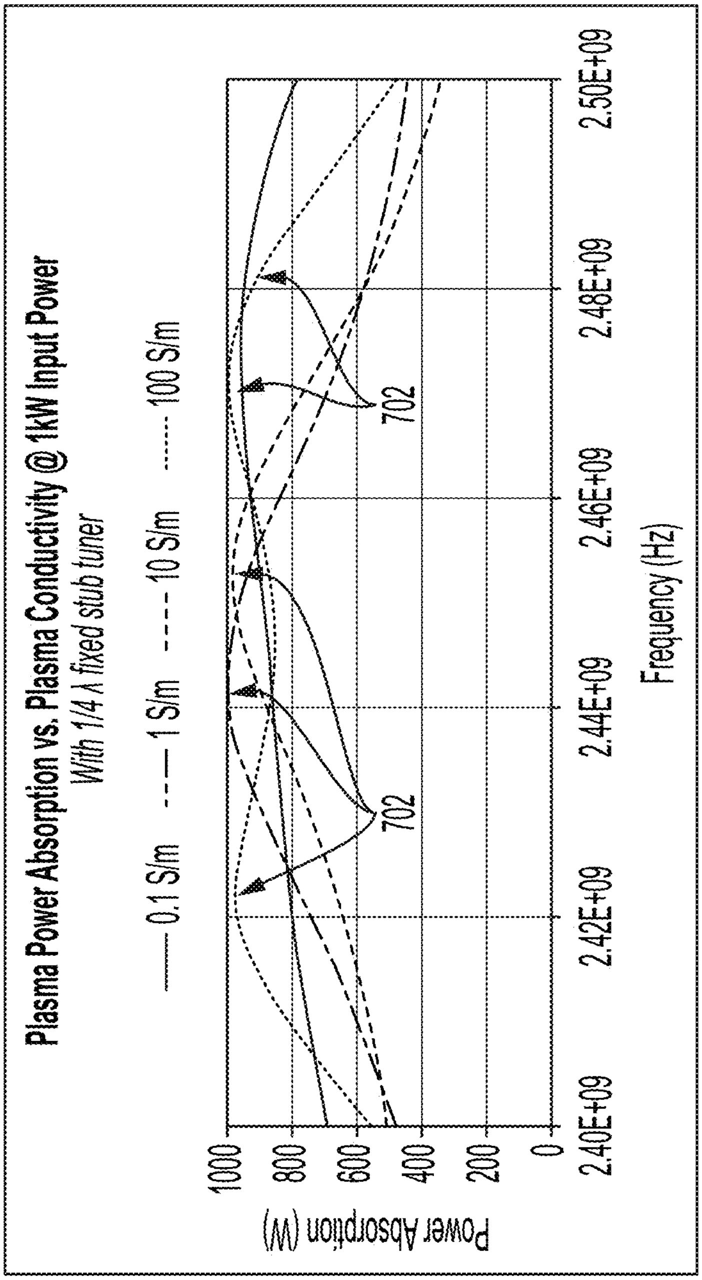
FIG. 7 shows exemplary simulation results of power absorbed in the plasma at about 1 kW of input power for the plasma applicator of the power delivery system of FIG. 3 incorporating the stub tuner of FIG. 4, according to some embodiments of the present invention.

FIG. 7 shows exemplary simulation results of power absorbed in the plasma 320 at about 1 kW of input power for the plasma applicator 302 of the power delivery system 300 of FIG. 3 incorporating the fixed stub tuner 400 of FIG. 4, according to some embodiments of the present invention. The illustrated power absorption simulation results are generated with the use of the fixed stub tuner 400 followed by frequency tuning in an operating frequency range of between about 2.4 GHZ and about 2.5 GHZ. The simulation is conducted for a range of plasma conductivities differing 3 orders or magnitude within the frequency range while the fixed stub tuner 400 is set with a stub length 412 of about 1.21 inches and a stub-to-applicator distance 502 of about 2.96 inches. In contrast with the simulation results of FIG. 2 produced using the prior art system 100 of FIG. 1, the results of FIG. 6 show that the fixed stub tuner 400 of FIG. 4 enables much better microwave coupling into the plasma 320, whereby almost all of the input power is absorbed in the plasma 320, thus minimizing reflection. More specifically, as shown in FIG. 7, the maximum amount of power delivered to the plasma 320 is about 944 W to about 994 W, depending on the conductivity. In addition, FIG. 7 indicates much better impedance matching between the microwave generator 304 and the plasma load, whereby power absorption peaks for the plasma impedances fall within the operating frequency range of the generator 304 of between about 2.4 GHz and about 2.5 GHz. More specifically, the results indicate that the positions 702 of maximum power absorption by the plasma 320 for various conductivities between about 0.1 S/m and about 100 S/m all fall within the frequency range of between about 2.4 GHz and about 2.5 GHz. In contrast, simulation results of FIG. 2 for the prior art system of FIG. 1 indicate that the maximum of power absorbed by the plasma of system 100 lies outside of the same operating frequency range. Similar simulation results can also be produced for the power delivery system 300 incorporating the stub tuner 600 of FIG. 6.

Figure 8:
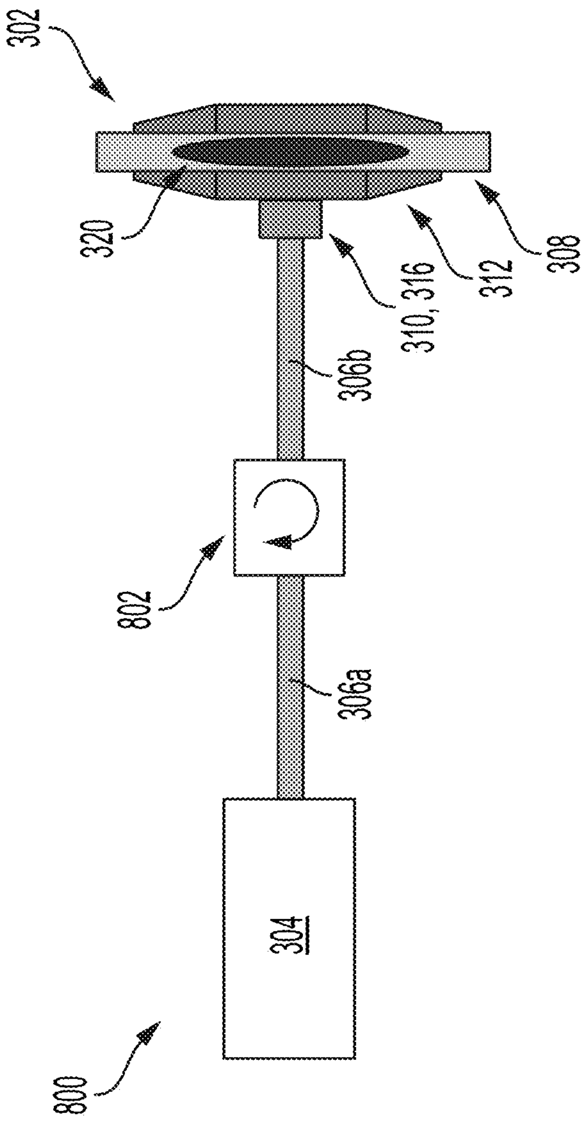
FIG. 8 shows another exemplary power delivery system configured for remote plasma generation, according to some embodiments of the present invention.

FIG. 8 shows another exemplary power delivery system 800 configured for remote plasma generation, according to some embodiments of the present invention. In general, the power delivery system 800 is substantially similar to the power delivery system 300 of FIG. 3, with the exception of an additional external isolator 802 positioned between the microwave generator 304 and the plasma applicator 302. For example, the same microwave generator 302, coarse tuner 316 with integrated couple element 310, and plasma applicator 302 from the system 300 of FIG. 3 can be used in the system 800 of FIG. 8. Further, multiple coaxial cables 306 can be used to interconnect the various components of the system 800, including an upstream coaxial cable 306*a* between the power generator 304 and the external isolator 802 and a downstream coaxial cable 306*b* between the external isolator 802 and the coarse tuner 316. The external isolator 802 is configured to protect the microwave generator 304 from high reflected power from the plasma applicator 302. This is particularly beneficial as the load impedance of a microwave delivery system for remote plasma generation can change significantly and rapidly, especially during plasma ignition, which can cause high reflected power spikes going back to the power generator, thereby damaging the solid-state power amplifiers in the generator if the isolators built into the generator are not sufficiently robust. In some embodiments, the external isolator 802 includes a directional coupler (not shown) for measuring the amount of power reflected from the plasma load toward the microwave generator 304.

Figure 9:
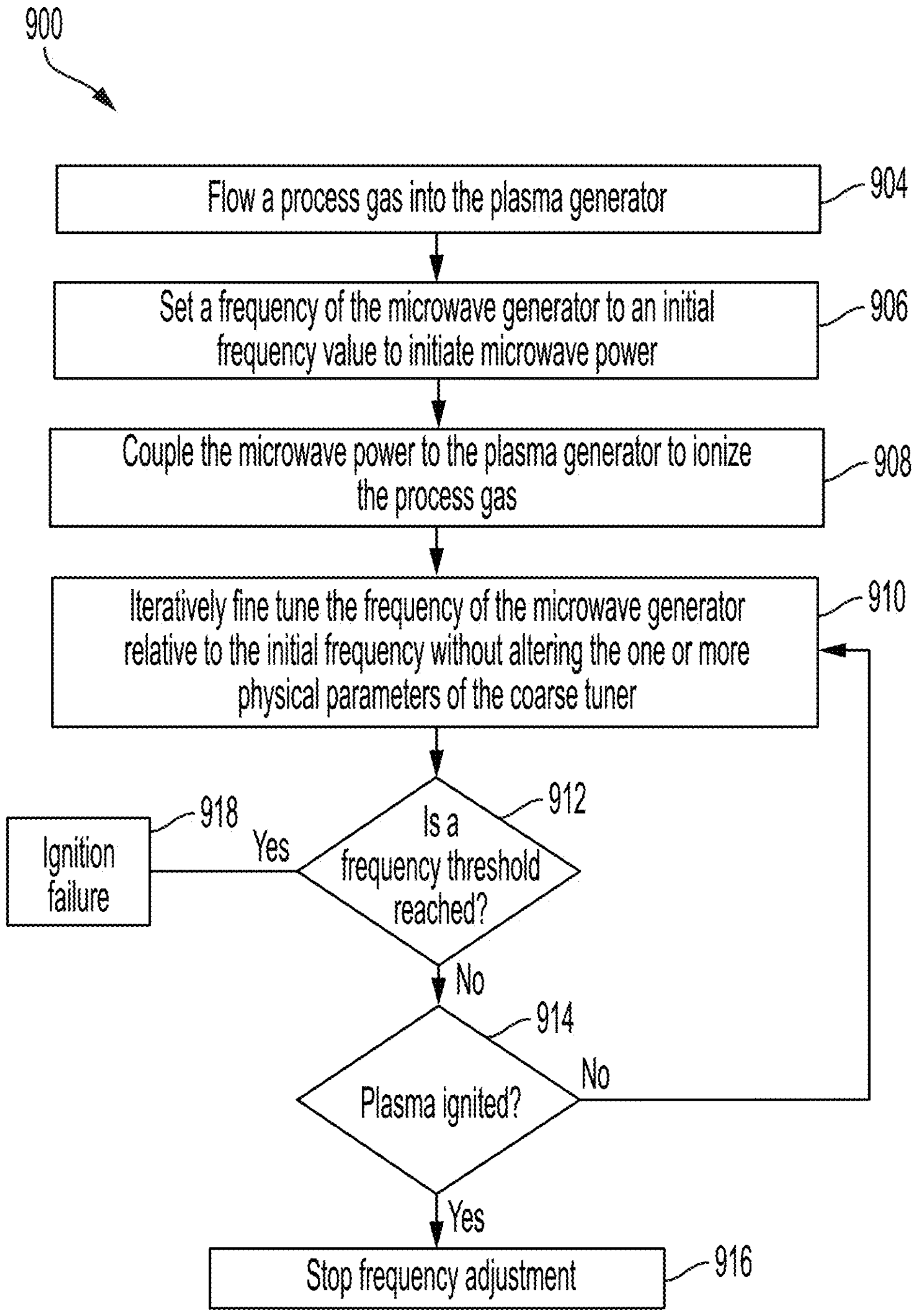
FIG. 9 shows an exemplary process for initiating plasma in a plasma ignition process by the power delivery system of FIG. 3 or FIG. 8, according to some embodiments of the present invention.

FIG. 9 shows an exemplary process 900 for initiating plasma in a plasma ignition process by the power delivery system 300, 800 of FIG. 3 or FIG. 8, according to some embodiments of the present invention. In some embodiments, prior to initiating the process 900 on the power delivery system 300, such as prior to installation of the coarse tuner 316 into the power delivery system 300, at least one parameter of the coarse tuner 316 of the power delivery system 300 is suitably tuned to achieve coarse impedance matching between the microwave generator 304 and an anticipated impedance range of plasma load that is likely to be generated at the plasma applicator 302 during both plasma ignition and steady state plasma maintenance. In some embodiments, the at least one parameter is the stub length 412 and/or the stub-to-applicator distance 502 described above with respect to the fixed stub tuner 400 of FIGS. 4 and 5. In some embodiments, the at least one parameter is the stub length 620 and/or the stub-to-applicator distance 502 described above with respect to the fixed stub tuner 600 of FIG. 6. For example, each parameter value can be determined offline using modeling and/or experimentally by simulating the load impedance of the plasma 320 over the desired impedance range such that a maximum of power absorbed by the plasma 320 is within an operating bandwidth of the variable-frequency microwave generator 304.

With the tuned coarse tuner 316 in place, the process 900 starts by providing a process gas to the plasma discharge tube 308 of the plasma applicator 304 (step 904). Once the process gas flow is stabilized, process pressure can be set and stabilized. The process 900 can then proceed to tune the frequency of the microwave generator 304 for plasma ignition in the applicator 302. First, the frequency of the microwave generator 304 is set to an initial frequency value to initiate microwave power at that set frequency (step 906). The resulting microwave power is coupled to the plasma applicator 302 via the integrated tuner 316 and coupling element 310 to ionize the process gas in the plasma applicator 302 (step 908). From the initial frequency, the frequency of the microwave generator 304 is iteratively adjusted without altering the physical parameters of the coarse tuner 316 (step 910). Each iteration can include determining if the process gas in the plasma discharge tube 308 is ignited at the microwave power corresponding to the tuned frequency (step 914) and discontinuing the frequency adjustment of the microwave generator 304 if plasma ignition is detected (step 916). Detection of plasma ignition can be accomplished using the plasma detector 504 described above with reference to FIG. 5. For example, at each frequency iteration, the microwave generator 304 can evaluate the signal transmitted by the plasma detector 504 to determine whether the plasma is ignited. In some embodiments, if the plasma is not ignited after a predetermined frequency threshold is reached (step 912), plasma ignition has failed (step 918). In some embodiments, the iterative fine tuning of the frequency of the microwave generator 304 involves iteratively increasing the frequency from the initial frequency (e.g., about 2400 MHZ) by a predetermined step (e.g., about 2 MHZ) until an upper bound (e.g., about 2500 MHZ) is reached. Alternatively, the iterative fine tuning of the frequency of the microwave generator 304 can involve iteratively decreasing the frequency from the initial frequency (e.g., about 2500 MHZ) by a predetermined step (e.g., about 2 MHZ) until a lower bound (e.g., about 2400 MHZ) is reached.

Figure 10:
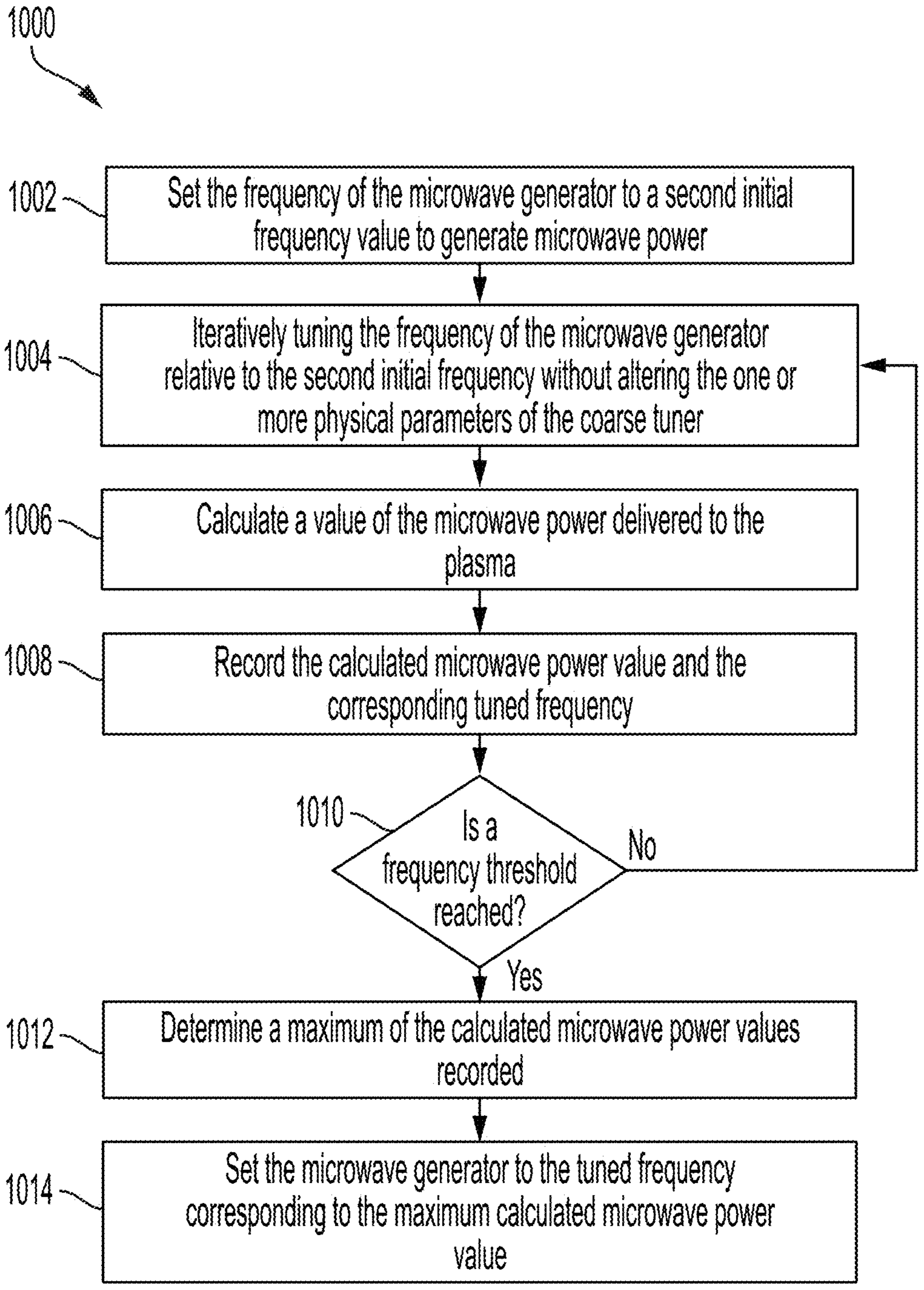
FIG. 10 shows an exemplary processing for maintaining plasma in a steady state process by the power delivery system of FIG. 3 or FIG. 8, according to some embodiments of the present invention.

FIG. 10 shows an exemplary process 1000 for maintaining plasma in a steady state by the power delivery system 300, 800 of FIG. 3 or FIG. 8, according to some embodiments of the present invention. In some embodiments, the steady state plasma maintenance process 1000 is executed after the plasma ignition process 900 of FIG. 9. The goal of the steady state process 1000 is to maximize the overall microwave power delivered to the plasma 320. During this process 1000, the coarse tuner 316 can remain set at the same physical parameters as those used during the plasma ignition process 900 described above with reference to FIG. 9. In general, initiating the plasma in the plasma applicator 302 by the process 900 and maximizing the microwave power delivered to the plasma after ignition by the process 1000 can be achieved without adjusting the coarse tuner 316 after its parameters are set prior to system operation.

The process 1000 starts by setting the frequency of the microwave generator to a second initial frequency value to generate microwave power (step 1002). The resulting microwave power is coupled to the plasma generator 302 to maintain the plasma 320 in the applicator 302. From the second initial frequency, the frequency of the microwave generator 304 can be iteratively adjusted without altering the physical parameters of the coarse tuner 316 until a threshold frequency value is reached (step 1004). Each iteration can involve calculating a value of the microwave power delivered to the plasma 320 (step 1006) and recording the calculated microwave power value and the corresponding frequency value at that iteration (step 1008). After the threshold frequency is reached (step 1010), a maximum of the recorded microwave power values is determined (step 1012) and the microwave generator 304 is set to the frequency value at which the maximum recorded microwave power is generated (step 1014).

In some embodiments, the iterative fine tuning of the frequency of the microwave generator 304 involves iteratively increasing the frequency from the second initial frequency (e.g., about 2400 MHZ) by a predetermined step (e.g., about 2 MHZ) until an upper bound (e.g., about 2500 MHZ) is reached. Alternatively, the iterative fine tuning of the frequency of the microwave generator 304 can involve iteratively decreasing the frequency from the second initial frequency (e.g., about 2500 MHZ) by a predetermined step (e.g., about 2 MHZ) until a lower bound (e.g., about 2400 MHZ) is reached. In some embodiments, at each frequency iteration, the value of the microwave power calculated is a difference between the forward power measured and reflected power measured. For the power delivery system 300 of FIG. 3, the forward power delivered to the applicator 302 and the reflected power from the applicator 302 can both be measured by the generator 304. For the power delivery system 800 of FIG. 8, the forward power delivered to the applicator 302 can be measured by the generator 304 and the reflected power from the applicator 302 can be measured by the external isolator 802. The calculation of the power delivered to the plasma 302 during each iteration (step 1008) can be accomplished by the system controller (not shown) for both systems 300, 800. In some embodiments, the system controller is also configured to store in its memory the calculated power values and the corresponding frequency values in a tabular format, for example.

Figure 1:
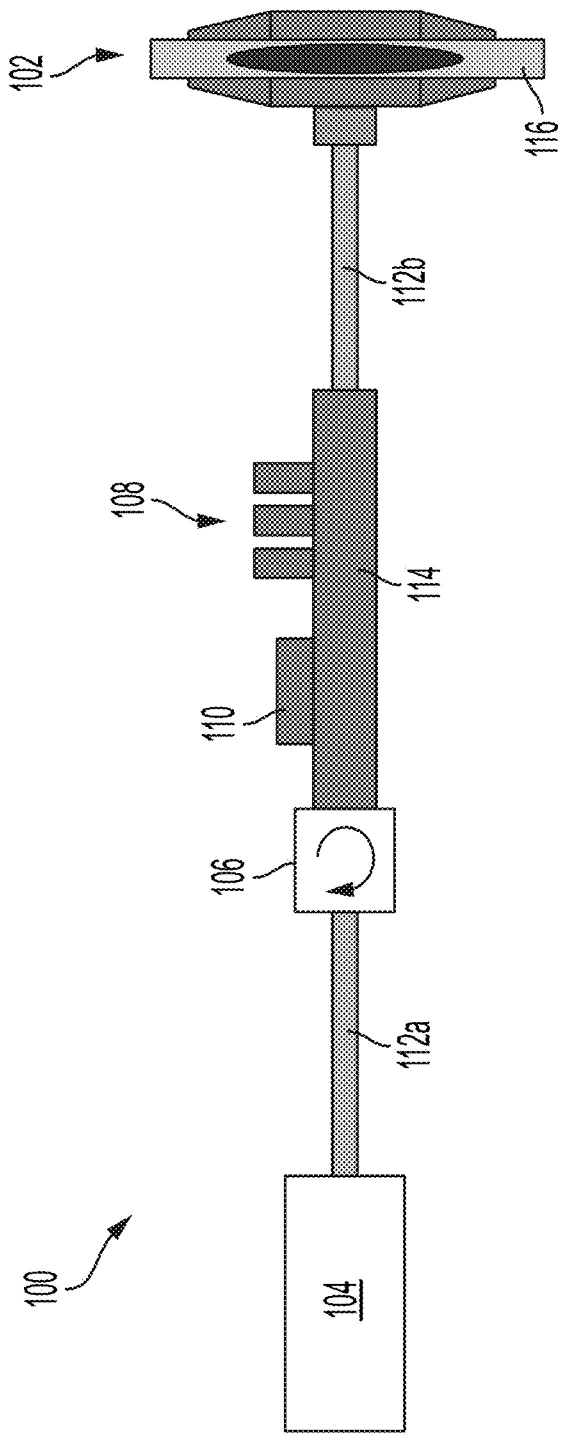
FIG. 1 PRIOR ART
FIG. 1 shows an exemplary prior art microwave power delivery system configured for remote plasma generation by a microwave applicator.
Figure 2:
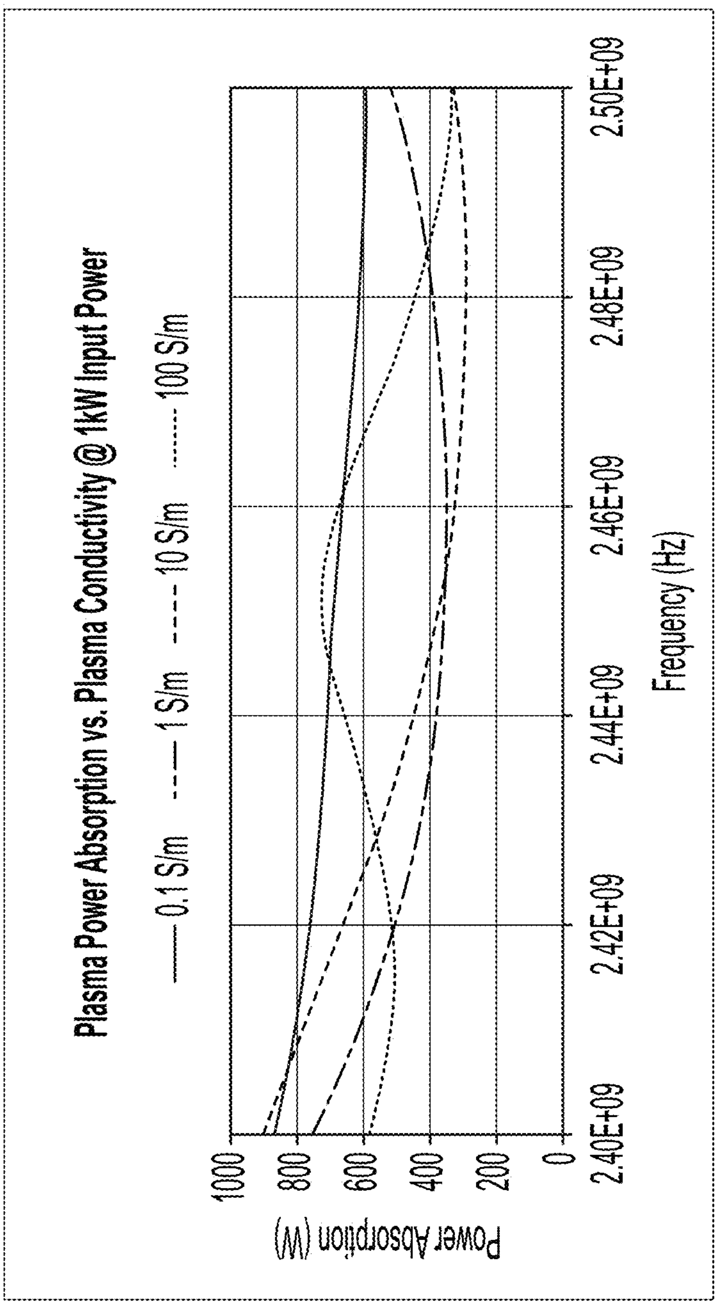
FIG. 2 PRIOR ART
FIG. 2 shows a set of simulation results of microwave power coupled to the plasma as a function of frequency for the prior art microwave power delivery system 100 of FIG. 1 at about 1 kilowatt of input power.

There are several advantages associated with incorporating a coarse tuner (e.g., the fixed stub tuner 400 of FIG. 4 or the stub tuner 600 of FIG. 6) in a microwave remote plasma generation system (e.g., the power delivery system 300, 800 of FIG. 3 or FIG. 8) in comparison to a conventional system (e.g., the prior art system 100 of FIG. 1). These advantages include eliminating the need for an automatic impedance matching network 108 from the system, thereby significantly reducing system cost, size and complexity. The reduced size and enhanced packaging flexibility are especially important in cases where the plasma applicator is integrated with the power delivery system. Also, by eliminating the automatic impedance matching network, which effectively limits the frequency bandwidth of the system, one can take full advantage of the solid-state power generator's inherent ability for frequency tuning to achieve impedance matching. Another advantage involves improving coupling of microwave energy into the plasma, thus increasing the amount of microwave power actually delivered to the plasma and reducing the amount of reflected power. Yet another advantage involves preventing overheating of the coaxial cable connecting the applicator to the rest of the power delivery system, thus improving overall system reliability.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A plasma-generating system comprising:

a variable-frequency microwave generator configured to generate microwave power;

a plasma applicator configured to use the microwave power from the microwave generator to (i) ignite a process gas therein for initiating a plasma in a plasma ignition process and (ii) maintain the plasma in a steady state process, wherein a load impedance of the plasma generated during the plasma ignition process and the steady state process is adapted to vary over an impedance range; and a coarse tuner connected between the microwave generator and the plasma applicator, wherein at least one physical parameter of the coarse tuner is adapted to be set to achieve coarse impedance matching between the microwave generator and the plasma generated during both the plasma ignition process and the steady state process;

wherein the microwave generator is configured to tune an operating frequency at the at least one set physical parameter of the coarse tuner, without altering the at least one set physical parameter of the coarse tuner during both the plasma ignition process and the steady state process, to achieve (i) ignition of the process gas during the plasma ignition process and (ii) optimization of the microwave power delivered to the plasma in the steady state process.

2. The plasma-generating system of claim 1, wherein the at least one physical parameter of the coarse tuner is set prior to both the plasma ignition process and the stead state process and remains unaltered during both the plasma ignition process and the steady state process.

3. The plasma-generating system of claim 2, wherein a value to set the at least one physical parameter of the coarse tuner ensures that the microwave power absorbed by the plasma over the impedance range of the plasma is within an operating frequency bandwidth of the microwave generator.

4. The plasma-generating system of claim 3, wherein the value is determined offline by at least one of microwave modeling or experimentation.

5. The plasma-generating system of claim 1, wherein the coarse tuner is a fixed stub tuner that includes at least a stub and a coupling antenna.

6. The plasma-generating system of claim 5, wherein the at least one physical parameter of the fixed stub tuner that remains unaltered during both the plasma ignition process and the steady state process comprises at least one of (i) a distance between the stub and a longitudinal axis of a dielectric plasma tube of the plasma applicator or (ii) a length of the stub.

7. The plasma-generating system of claim 6, wherein the stub length is set to about 1.21 inches prior to both the plasma ignition process and the stead state process.

8. The plasma-generating system of claim 6, wherein the distance is set to about 2.96 inches prior to both the plasma ignition process and the stead state process.

9. The plasm-generating system of claim 5, wherein the fixed stub tuner is a quarter wavelength fixed stub tuner.

10. The plasma-generating system of claim 5, wherein the fixed stub tuner is electrically shorted to prevent microwave radiation to the environment.

11. The plasma-generating system of claim 5, wherein the length of the stub is set prior to both the plasma ignition process and the stead state process by translating a length of a short segment of the tuner via a plunger assembly.

12. The plasma-generating system of claim 5, wherein the coupling antenna of the fixed stub tuner is inserted into a microwave cavity of the plasma applicator and positioned proximate to a plasma discharge tube of the plasma applicator within which the plasma is generated, the coupling antenna configured to couple power into the plasma.

13. The plasma-generating system of claim 5, wherein a segment of the fixed stub tuner is configured to become a portion of a coaxial cable transmission line connecting the fixed stub tuner to the microwave generator.

14. The plasma-generating system of claim 1, wherein an automatic impedance matching network is absent between the microwave generator and the plasma applicator.

15. The plasma-generating system of claim 1, wherein the coarse tuner is attached to an outer housing of the plasma applicator.

16. The plasma-generating system of claim 1, wherein, during the plasma ignition process, the microwave generator is configured to iteratively adjust the operating frequency without altering the at least one set physical parameter of the coarse tune until the ignition of the process gas is detected.

17. The plasma-generating system of claim 16, wherein the microwave generator iteratively adjusts the operating frequency by a predetermined step during each iteration within an operating frequency bandwidth of the microwave generator.

18. The plasma-generating system of claim 1, wherein, during the steady state process, the microwave generator is configured to iteratively adjust the operating frequency without altering the at least one set physical parameter of the coarse tuner to determine a maximum of the microwave power for maintaining the plasma in a steady state.

19. The plasma-generating system of claim 18, wherein the microwave generator iteratively tunes the operating frequency by a predetermined step during each iteration within an operating frequency bandwidth of the microwave generator.

20. The plasma-generating system of claim 1, further comprising an isolator located between the microwave generator and the coarse tuner to minimize reflected power from the plasma application to the microwave generator.

* * * * *